United States Patent [19]

Nakagawa et al.

[11] Patent Number: 5,508,765
[45] Date of Patent: Apr. 16, 1996

[54] MATRIX-ADDRESSED TYPE DISPLAY DEVICE

[75] Inventors: Naoki Nakagawa; Satoru Kawamoto; Hirokazu Sakamoto; Masahiro Hayama, all of Amagasaki, Japan

[73] Assignee: Mitsubishi Denki Kabushiki Kaisha, Tokyo, Japan

[21] Appl. No.: 258,380

[22] Filed: Jun. 10, 1994

Related U.S. Application Data

[63] Continuation of Ser. No. 46,370, Apr. 13, 1993, which is a continuation of Ser. No. 728,521, Jul. 11, 1991.

[30] Foreign Application Priority Data

Jul. 25, 1990 [JP] Japan ................................ 2-200704

[51] Int. Cl.⁶ ........................................ G02F 1/133
[52] U.S. Cl. ................ 359/59; 359/87; 257/59; 257/296; 257/300; 257/307
[58] Field of Search .................. 359/55, 58, 54, 359/87, 59; 257/59, 60, 61, 296, 300, 307, 390

[56] References Cited

U.S. PATENT DOCUMENTS

| 4,431,271 | 2/1984 | Okubo | 359/58 X |
|---|---|---|---|
| 4,639,087 | 1/1987 | Cannella | 359/87 X |
| 4,761,058 | 8/1988 | Okubo et al. | 359/57 |
| 4,772,099 | 9/1988 | Kato et al. | 359/87 X |
| 5,017,984 | 5/1991 | Tanaka et al. | 257/61 |
| 5,060,036 | 10/1991 | Choi | 257/61 |
| 5,151,806 | 9/1992 | Kawamoto et al. | 359/59 |
| 5,173,792 | 12/1992 | Matsueda | 359/59 |
| 5,182,661 | 1/1993 | Ikeda et al. | 359/54 |
| 5,212,574 | 5/1993 | Katayama et al. | 359/59 |

FOREIGN PATENT DOCUMENTS

| 0288011 | 10/1988 | European Pat. Off. . | |
| 0184517 | 8/1986 | Japan | 359/59 |
| 63-58958 | 3/1988 | Japan . | |
| 64-62618 | 3/1989 | Japan . | |
| 1072121 | 3/1989 | Japan | 359/59 |
| 1140129 | 6/1989 | Japan . | |
| 0165124 | 6/1990 | Japan | 359/59 |

OTHER PUBLICATIONS

Luo et al.; IEEE Biennial Display Research Conference, Oct. 1980 pp. 111–113, "A Low Leakage Current Thin-Film-Transistor for Flat Panel Display".

Lahatos; Proceedings of the SID, vol. 24/2, 1983, pp. 185–192 "Promise and challenge of Thin Film Silicon Approaches to Active Matricies".

Sveuki et al.; Proceedings of the SID, vol. 25/1, 1984, pp. 11–19 "A 220×240 Pixel α-Si Thin Film Transistor Matrix Transmission LCD".

Uchida et al.; Molecular Crystals and Liquid Crystals, 1988, pp. 533–571 "Liquid Crystal Television".

Patent Abstracts of Japan, vol. 10, No. 183, Jun. 1986.

Primary Examiner—William L. Sikes
Assistant Examiner—Kenneth Parker

[57] ABSTRACT

A matrix-addressed type display device has display material sandwiched between two substrates facing each other, and a transparent pixel electrode disposed in matrix arrangement. The display device display characters by the application of a voltage selectively to the transparent pixel electrode by the use of a thin-film transistor. To improve display characteristics, an electric charge capacitor is provided in each pixel. This electric charge capacitor is connected to an adjacent gate electrode path and includes a transparent inner bottom electrode sandwiched between a dielectric substrate and a transparent pixel electrode. A transparent dielectric film is Interposed between the transparent pixel electrode and the transparent inner bottom electrode.

19 Claims, 2 Drawing Sheets

MATRIX-ADDRESSED TYPE DISPLAY DEVICE

This application is a continuation, of application Ser. No. 08/046,370 filed Apr. 13, 1993, now abandoned, which was a continuation of application Ser. No. 07/728,521 filed Jul. 11, 1991, now abandoned.

BACKGROUND OF THE INVENTION

1: Field of the Invention

This invention relates to a matrix-addressed type display device having pixels disposed in a matrix arrangement.

2: Description of the Related Arts:

Conventionally, the matrix-addressed type display device has a structure in which display material, such as liquid crystals, is sandwiched between two substrates facing each other. Upon the surface of at least one substrate are disposed pixel electrodes composed of a transparent dielectric film arranged in a matrix. A switching element such as a transistor for the selective application of a voltage is also provided at each pixel electrode. Moreover, an electric charge capacitor is formed for Improving the display characteristics of each pixel element.

Hitherto, there has been proposed several liquid crystal display devices as illustrated in FIGS. 3 to 5 of the accompanying drawings.

FIG. 3 is an equivalent circuit diagram showing the circuit configuration of a thin-film transistor array substrate of a conventional matrix-addressed type display device. In FIG. 3, the reference numerals 1 and 2 designate a plurality of gate electrode paths and source electrode paths, respectively; 3, a thin-film transistor; and 4, 5, 6, a gate electrode path, a source electrode path, a drain electrode path, respectively of the thin-film transistors. The gate electrode 4 is connected to the gate electrode path 1, and the source electrode 5 is connected to the source electrode path 2. The reference numeral 7 designates an electric charge capacitor having one electrode thereof connected to the drain electrode 6 of the thin-film transistor 3 and the other electrode thereof connected to an adjacent gate electrode path 1.

Here, a gate electrode path 1 next to the gate electrode path 1 to which the gate electrode 4 of the thin-film transistor 3 is connected is defined as an adjacent gate electrode path 1.

FIG. 4 is a top view showing the structure of the thin-film transistor array substrate of FIG. 3. FIG. 5 is a cross-sectional view of FIG. 4 taken along the line V—V. In the drawings, the reference numeral 8 designates a transparent dielectric substrate, such as glass or the like. Upon this dielectric substrate 8 are formed a plurality of metal gate electrode paths 1 parallel to each other a given distance apart.

In addition, the source electrode paths 2 are spaced parallel to each other at right angles to the gate electrode paths 1 via a gate dielectric film, as will be described later. The reference numeral 9 designates a rectangular matrix array addressed by the gate electrode paths 1 and the source electrode paths 2. As shown in FIG. 4, the gate electrode 4 is formed by stretching a part of the gate electrode path 1 into the matrix array 9.

The reference numeral 11 designates an electric charge capacitor electrode superimposed over the surface of the dielectric substrate 8, and this capacitor electrode is formed by stretching a part of the adjacent gate electrode 1, that is the gate electrode 1 disposed downwards of FIG. 4, into the matrix array 9.

The reference numeral 12 designates a transparent gate dielectric film deposited over the dielectric substrate 8, the dielectric film being composed of a silicon nitride film (SiNx) and the like in such a manner as to be superimposed over the gate electrode path 1, the gate electrode 4 and the electric charge capacitive electrode 11. The gate dielectric film 12 is omitted in FIG. 4.

The reference numeral 13 is a semiconductor film formed over the gate electrode 4 via the gate dielectric film 12. Source electrode paths 2 are composed of metal and formed over the gate dielectric film 12, and a source electrode 5 is formed by extending a part of the source electrode path 2 in such a manner as to overlap the semiconductor film 13.

Moreover, drain electrodes 6 are composed of metal and formed on the thin-film 13 a given distance apart from the source electrode. The thin-film transistor 3 is composed of the gate electrode 4, the semiconductor film 13, the gate dielectric film 12 interposed between the gate electrode 4 and the semiconductor film 13, the source electrode 5, and the drain electrode 6.

The reference numeral 14 designates a pixel electrode provided on the gate dielectric film 12. The pixel electrode 14 is composed of a transparent conductive film such as indium-tin-oxide (ITO) or the like, and is formed over the entire matrix array 9 other than the area where the thin-film transistor 3 is formed, and is connected to the drain electrode 6 at the overlapping portion thereof. The electric charge capacitor 7 consists of the electric charge capacitive electrode 11, the pixel electrode 14, and the gate dielectric film 12 sandwiched between the electrodes in the area at which these three are superimposed upon one another.

The reference numeral 15 designates a transparent protective film composed of SiNx and the like and is formed over the entire matrix array 9. In FIG. 4, the protective film 15 is omitted for clarity.

The thin-film transistor array substrate consists of a plurality of pixel electrodes 14 and thin-film transistors 3 disposed in a row and column arrangement.

The matrix-addressed type display device comprises the thin-film transistor array substrate, and a non-illustrated opposing substrate having both a transparent conductive substrate and a color filter substrate disposed thereon with the non-illustrated display material such as liquid crystals sandwiched therebetween.

In the matrix-addressed type display device having the above structure, the aforementioned matrix array 9 defines a pixel. Therefore, the application of a voltage to the pixel electrode by means of the thin-film transistor 3 causes graphics and characters to be displayed. As a result, the electric charges stored at the electric charge capacitor 7 determine the display characteristic of the liquid crystal.

Since the conventional matrix-addressed type display device has the structure as set forth in the above, the efficiency in display is impaired by the presence of the matrix array region where the electric charge capacitor is formed. Accordingly, the increase in the capacitance of the electric charge capacitor and the decrease in the pixel pitch result in the drop in the ratio of angular aperture, thereby disadvantageously impairing the display characteristics.

SUMMARY OF THE INVENTION

This invention aims to overcome the above described drawbacks in the conventional art, and an object of the present invention is to provide a matrix-addressed type display device with excellent display characteristics which can prevent the deterioration of the display In the ratio of the angular aperture even when the electric charge capacitance is increased and the pixel is reduced to obtain a fine resolution.

To this aim, according to one aspect of this invention, there is provided a matrix-addressed type display device comprising a transparent inner bottom electrode interposed between a dielectric substrate and a pixel electrode and connected to an adjacent gate electrode.

In the matrix-addressed type display device embodying this invention, the inner bottom electrode and the pixel electrode serve as two conductor electrodes for an electric charge capacitor, and since these electrodes are transparent conductors, the display of each matrix array is never impaired by the presence of the electric charge capacitor, thereby enhancing the pixel in the ratio of the angular aperture.

BRIEF DESCRIPTION OF THE INVENTION

The novel features believed characteristics of the invention are set forth in the appended claims. The Invention itself, however, as well as other features and advantages thereof, will be best understood by reference to the detailed description which follows read in conjunction with the accompanying drawings, wherein:

DETAILED DESCRIPTION OF THE INVENTION

Figure 1:
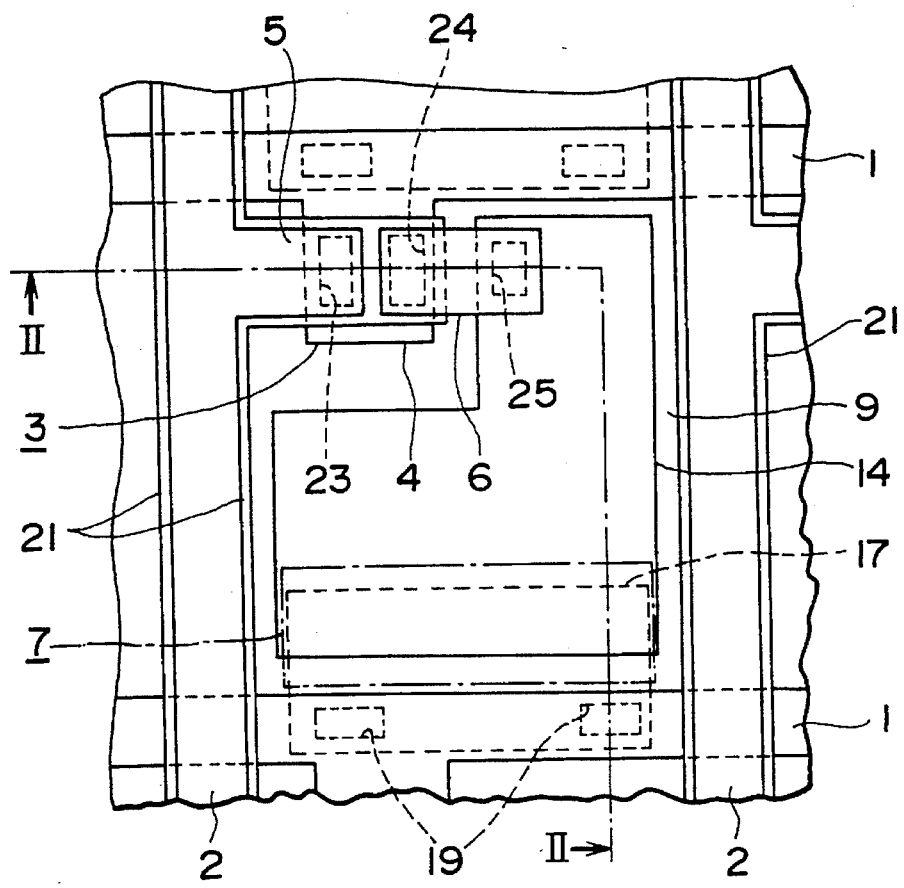
FIG. 1 is a top view showing the structure of a thin-film transistor array substrate of a matrix-addressed type display device according to one embodiment of this invention.
Figure 2:
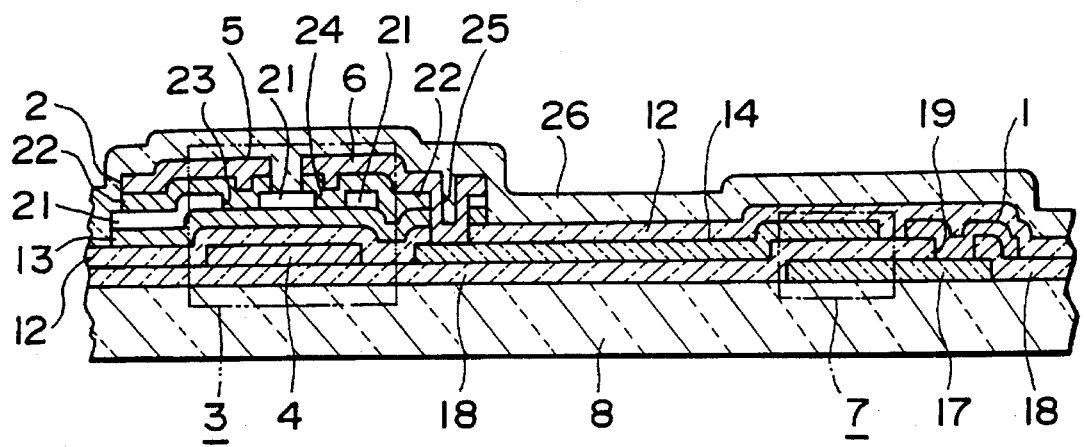
FIG. 2 is a cross-sectional view showing the thin-film transistor array substrate of FIG. 1 taken along a line II—II.

Referring to the accompanying drawings, a preferred embodiment of this invention will be described hereinbelow. FIG. 1 is a top view showing a thin-film transistor array substrate for use in a matrix-addressed type display device according to one embodiment of the present invention; and FIG. 2, a cross-sectional view of FIG. 1 taken along the line II—II.

Figure 3:
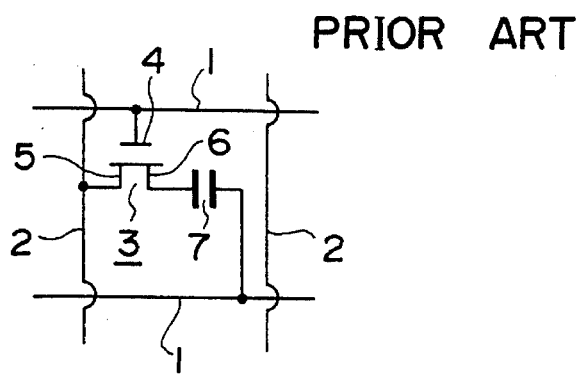
FIG. 3 is an equivalent circuit of a thin-film transistor array substrate of a conventional matrix-addressed type display device.
Figure 4:
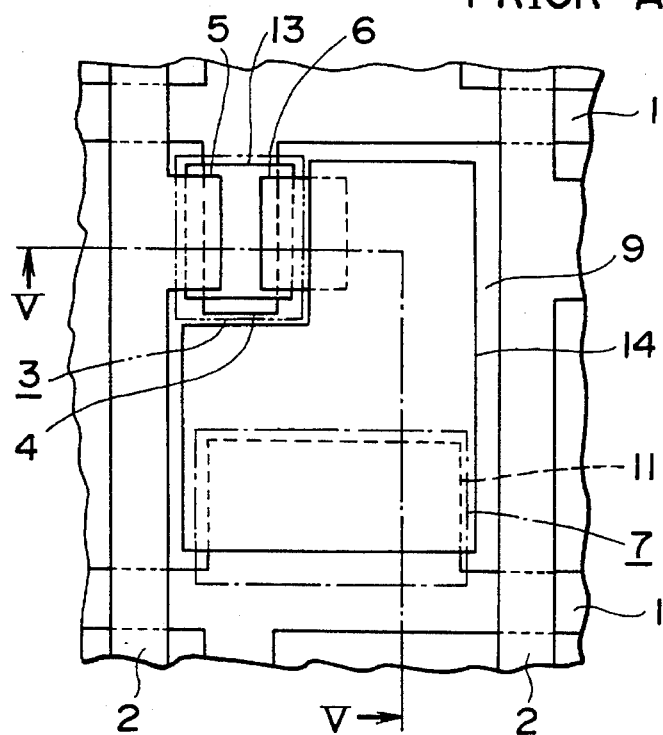
FIG. 4 is a top view of the thin-film transistor array substrate of the conventional matrix-addressed type display device.
Figure 5:
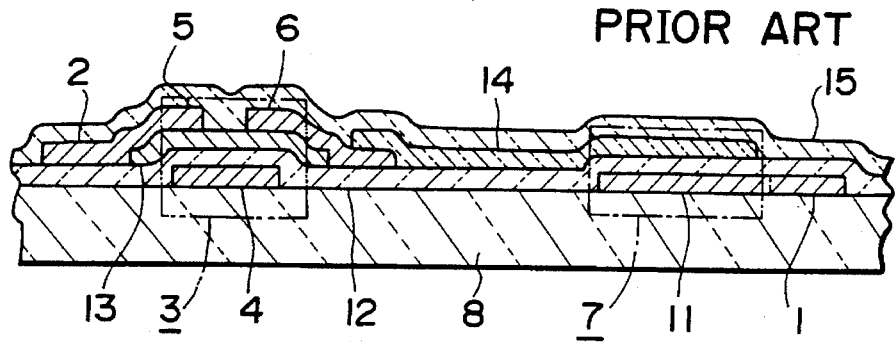
FIG. 5 is a cross-sectional view of the thin-film transistor array of FIG. 4 taken along a line V—V.

An equivalent circuit of the thin-film transistor embodying this invention is identical to FIG. 3. In addition, similar to the structure of a conventional thin-film transistor, the thin-film transistor array according to this embodiment has a structure in which a matrix array area 9 comprising a thin-film transistor 3 and a pixel electrode 14 is addressed by the plurality of gate electrode paths 1 and source electrode paths 2.

In these drawings, the reference numeral 8 designates a transparent dielectric substrate; 17, a transparent inner bottom electrode formed over the dielectric substrate 8; 18, a transparent electric charge capacitive dielectric film formed over the dielectric substrate 8 in such a manner as to superimpose over the inner bottom electrode 17. The electric charge capacitive dielectric film 18 is omitted for clarity in FIG. 1, and a gate dielectric film and a second protective film are omitted for the same reason.

The reference numeral 14 designates a pixel electrode composed of a transparent conductive film and formed on the electric charge capacitive dielectric film 18. An electric charge capacitor 7 consists of the electric charge capacitive dielectric film 18 sandwiched between the pixel electrode 14 and the inner bottom electrode 17, and is specifically formed at the overlapping area of the electric charge capacitive dielectric film 18 at which the pixel electrode 14 is superimposed over the inner bottom electrode 17.

The reference numeral 1 designates gate electrode paths spatially parallel to each other formed over the electric charge capacitive film 18; 4, a gate electrode which is elongated from the gate electrode paths 1 disposed at the top of FIG. 1 towards the matrix-addressed array region 9. The pixel electrode 14 is connected to the adjacent electrode path 1 via a first contact hole 19, namely, connected to a gate electrode path 1 disposed at the bottom of FIG. 1.

The reference numeral 12 designates a transparent gate dielectric film formed over the gate electrode path 1; 13, a semiconductor film formed over the gate electrode 4 by way of the gate dielectric film 12; 21, a first protective film formed over the semiconductor film 13; and 22, a phosphor-doped semiconductor film formed over the first protective film 21 and divided Into two pieces spatially separated from each other, each being connected to the semiconductor film 13 via second and third contact holes 23 and 24, respectively.

The reference numeral 2 designates source electrode paths spatially disposed parallel to each other intersecting the gate electrode paths 1 at right angles; 5 and 6, a source electrode and a drain electrode, respectively, formed over the phosphor-doped semiconductor film 22. The source electrode 5 is elongated from the source electrode path 2, while the drain electrode 6 is connected to the pixel electrode 14 through a fourth contact hole 25.

A thin-film transistor 3 is constituted of the gate electrode 4, the gate dielectric film 12, the semiconductor film 13, the first protective film 21, the phosphor-doped semiconductor film 22, the source electrode 5, and the drain electrode 6. Other than the area where the thin-film transistor 3 is formed, the pixel electrode 14 is formed over the entire matrix array area 9. The reference numeral 26 designates a second transparent protective film formed over the uppermost part of the matrix-addressed area.

A manufacturing method of the matrix-addressed type display device will now be described hereinbelow. Initially, a transparent conductive film composed of indium-tin-oxide (ITO) or the like is deposited on the surface of the glass dielectric substrate 8. An island-shaped inner bottom electrode 17 is formed by patterning the transparent conductive film. Therefore, the electric charge capacitive dielectric film 18 is composed of SiNx or the like.

A transparent conductive film of ITO is further deposited over the surface of the electric charge capacitive dielectric film 18, and formed into the pixel electrode 14 by patterning the capacitive dielectric film 18 into the island shape. After the first contact hole 19 has been formed on the surface of the electric charge capacitive dielectric film 18, metal such as chrome (Cr) is deposited over the capacitive dielectric film 18.

The gate electrode paths 1 and the gate electrodes 4 are formed by patterning the deposited metal. During that time, the gate electrode path 1, that is, the gate electrode path 1 disposed towards the bottom of FIG. 1 Is electrically coupled with the inner bottom electrode 17 via the first contact hole 19. Hydride amorphous silicon (a-SI:H) and SiNx are continuously and sequentially deposited over one another by chemical vapor deposition, thereby forming the gate dielectric film 12, the semiconductor film 13 and the first protective film 21.

The phosphor-doped semiconductor film 22 is formed by depositing the hydride amorphous silicon film (n+-a-Si:H) doped with phosphor after the second and third conductor holes 23, 24 have been formed by patterning the first protective film 21. After the completion of a fourth contact hole which penetrates through the phosphor-doped semiconductor film 22, the semiconductor film 13 and the gate dielectric film 12, respective source electrode path 2, source electrode 5 and drain electrode 6 are formed by the deposition of metal such as aluminum (Al) on the contact hole by means of patterning.

On the surface of the electrodes mentioned above, a second protective film is formed by depositing material such as SiNx on the entire surface of the above electrodes by means of chemical vapor deposition.

The matrix-addressed type display device consists of the thin-film transistor array substrate having the above structure, the non-illustrated opposing substrate placed in such a manner as to face the thin-film transistor, and the non-illustrated display material sandwiched between the above two substrates.

In the matrix-addressed type display device having the above-mentioned structure, since the inner bottom electrode 17 of the electric charge capacitor 7 is transparent, an optical display path is not interrupted at the operation by the presence of the opaque inner bottom electrode, and the whole of the pixel electrode 14 including the electric charge capacitance 7 effects display efficiently.

In this embodiment, since the electric charge capacitive dielectric film 18 and the gate dielectric film 12 are formed separately from each other, there are no limitations on material, that is the quality and thickness of film, due to the application of the same material to these two films.

According to this invention, for instance, it is possible to improve the characteristics of the thin-film transistor 3 by reducing the thickness of the gate dielectric film 12 and prevent short circuits by electrically reinforcing the electric charge capacitive dielectric film, thereby improving the apparatus in performance.

As described above, according to this invention, since the transparent inner bottom electrode is formed between the dielectric substrate and the pixel electrode, two electrodes in the electric charge capacitance become translucent and capable of effecting display with a high efficiency, whereby the ratio of the angular aperture is increased even when the electric capacitance is increased to improve the performance.

While this invention has been described with reference to an illustrative embodiment, this description is not intended to be construed in a limiting sense. Various modifications of the illustrative embodiment, as well as other embodiments of the invention, will be apparent to persons skilled in the art upon reference to this description. For example, applying a voltage to a transistor to turn it on, applying a larger voltage to a pixel electrode through a contact hole formed in an insulating film in response to the transistor turn-on, and applying a potential to an inner bottom electrode through a contact hole formed in a dielectric film of a capacitor in order to enhance the operating of a matrix-addressed type display device according to the present invention. It is, therefore, contemplated that the appended claims will cover any such modifications or embodiments as fall within the true scope of the invention.

What is claimed is:

1. A matrix-addressed type display device comprising:

a transparent substrate;

a drain electrode;

a plurality of gate electrodes formed on a surface of said transparent insulating substrate, said gate electrodes being positioned in parallel with each other;

a plurality of source electrodes formed on a surface of said transparent insulating substrate, said source electrodes being positioned in parallel with each other and crossing said gate electrodes;

a thin-film transistor formed in a region where a gate electrode and a source electrode cross each other;

a transparent pixel electrode formed in said region and connected to said thin-film transistor;

a transparent inner bottom electrode positioned between said transparent insulating substrate and said transparent pixel electrode;

a transparent dielectric film positioned between said transparent inner bottom electrode and said transparent pixel electrode, said transparent dielectric film having a first contact hole for connecting said transparent inner bottom electrode to a bottom region of said gate electrode; and a gate insulating film formed on said gate electrode paths; wherein said gate electrode is formed on a different plane than said transparent inner bottom electrode;

said transparent pixel electrode being connected to said drain electrode through a second contact hole.

2. The device as claimed in claim 1, wherein said transparent inner bottom electrode is composed of ITO.

3. The device as claimed in claim 1, wherein said transparent dielectric film is made of $SiN_x$.

4. A semiconductor element usable in a matrix-addressed type display device comprising:

a capacitor including a transparent bottom electrode, a transparent top electrode, and a dielectric film interposed between said transparent bottom electrode and said transparent top electrode;

a first feed gate electrode, connected to said transparent bottom electrode through a contact hole formed in said dielectric film; and a first transistor, including a second feed electrode connecting a source or drain of said first transistor to said transparent top electrode through a contact hole formed in a gate dielectric layer of said first transistor;

wherein said first feed gate electrode is a gate electrode of a second transistor.

5. The semiconductor element of claim 4, wherein said bottom transparent electrode and said top transparent electrode are formed out of indium-tin-oxide.

6. The semiconductor element of claim 4, adapted as part of a liquid crystal display.

7. The semiconductor element of claim 5, wherein said first transistor includes a gate electrode formed on a plane separate from said bottom transparent electrode.

8. The semiconductor element of claim 4, wherein said first transistor includes a gate electrode, formed on plane separate from said bottom transparent electrode.

9. The semiconductor element of claim 4, wherein said dielectric film is formed out of $SiN_x$.

10. A liquid crystal display having a plurality of pixel elements, each pixel element comprising:

a first film transistor, including a gate electrode and a drain electrode;

a capacitor, having a top transparent film electrode, a bottom transparent film electrode, and a dielectric film layered between said top transparent film electrode and said bottom transparent film electrode;

a charging film electrode, connected to said bottom transparent film electrode through a contact hole formed in said dielectric film to control a voltage applied thereto;

said bottom transparent film electrode and said gate electrode of the first film transistor are formed on separate planes; and said drain electrode is connected to said top transparent film electrode through a contact hole formed in a gate dielectric layer, said gate dielectric layer and said dielectric film being formed separate planes.

11. The liquid crystal display of claim 10, wherein in at least one of said plurality of pixel elements, said charging film electrode is a gate electrode of an adjacent pixel element.

12. The liquid crystal display of claim 10, wherein in each of said plurality of pixel elements, said top transparent film electrode is separated from said first film transistor by at least said dielectric film.

13. The liquid crystal display of claim 10, wherein in each of said plurality of pixel elements, said bottom film electrode and said top transparent film electrode are made of indium-tin-oxide.

14. The liquid crystal display of claim 10, wherein said dielectric film is formed out of $SiN_x$.

15. A method of charging a capacitor in a display apparatus with a transistor and a separate electrode, the capacitor formed of a bottom transparent electrode, a top transparent electrode and a dielectric film interposed therebetween, the top transparent electrode separated from said transistor by at least a gate dielectric film, the method comprising:

(a) applying a first voltage to a control electrode in order to turn on the transistor;

(b) applying a second larger voltage to said top transparent electrode with an output of the transistor through a contact hole formed in the gate dielectric film, in response to the application of a first voltage in step (a); and (c) applying a third potential to said bottom transparent electrode with the separate electrode through a contact hole formed in the dielectric film.

16. A method of making a matrix addressed type display device, comprising the steps of:

forming a bottom transparent electrode on a substrate;

forming a dielectric film over the bottom transparent electrode and the substrate;

forming a contact hole in the dielectric film over the bottom transparent electrode;

forming a first voltage electrode on the dielectric film and over the contact hole, connecting the first voltage electrode to the bottom transparent electrode;

forming a second voltage electrode on the dielectric film, on a different plane than the bottom transparent electrode;

forming a top transparent electrode over the dielectric film;

forming an insulating layer to over any exposed portions of the first voltage electrode, the second voltage electrode, the dielectric film and the top transparent electrode;

forming a second contact hole in the insulating layer over the top transparent electrode; and forming a transistor having an output connected to the top transparent electrode through the second contact hole, the transistor having the second voltage electrode as a control input.

17. The method of claim 16, wherein the step of forming a bottom transparent electrode and the step of forming a top transparent electrode each include forming an electrode made of indium-tin-oxide.

18. The method of claim 16, wherein the step of forming a transistor includes forming a transistor having a d rain electrode as its output, and the step of forming a second voltage electrode includes forming a gate electrode of the transistor as the second voltage electrode.

19. The method of claim 16, wherein the step of forming a dielectric film includes forming a dielectric film made of $SiN_x$.

* * * * *